(12) United States Patent  (10) Patent No.: US 9,383,894 B2
Schwesinger et al.  (45) Date of Patent: Jul. 5, 2016

(54) VISUAL FEEDBACK FOR LEVEL OF GESTURE COMPLETION

(71) Applicant: MICROSOFT TECHNOLOGY LICENSING, LLC, Redmond, WA (US)

(72) Inventors: Mark Schwesinger, Bellevue, WA (US); Emily Yang, Seattle, WA (US); Jay Kapur, Redmond, WA (US); Christian Klein, Duvall, WA (US); Oscar Murillo, Redmond, WA (US); Sergio Paolantonio, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 183 days.

(21) Appl. No.: 14/150,669

(22) Filed: Jan. 8, 2014

(65) Prior Publication Data

US 2015/0193124 A1   Jul. 9, 2015

(51) Int. Cl.
  *G06F 3/048* (2013.01)
  *G06F 3/0481* (2013.01)
  *G06F 3/01* (2006.01)

(52) U.S. Cl.
  CPC ............ *G06F 3/04812* (2013.01); *G06F 3/017* (2013.01)

(58) Field of Classification Search
  CPC ................. G06F 3/011; G06F 3/017; G06F 3/04815–3/04883
  See application file for complete search history.

(56) References Cited

U.S. PATENT DOCUMENTS

| | | | | |
|---|---|---|---|---|
| 6,097,390 A | * | 8/2000 | Marks | G06F 3/04812 715/772 |
| 2002/0130838 A1 | * | 9/2002 | Feierbach | G06F 3/04892 345/157 |
| 2011/0099476 A1 | * | 4/2011 | Snook | G06F 3/011 715/728 |
| 2011/0185309 A1 | | 7/2011 | Challinor et al. | |
| 2012/0016960 A1 | * | 1/2012 | Gelb | H04N 7/147 709/217 |
| 2012/0223882 A1 | * | 9/2012 | Galor | G06F 3/011 345/157 |
| 2012/0287044 A1 | | 11/2012 | Bell et al. | |
| 2013/0055150 A1 | | 2/2013 | Galor | |
| 2013/0117653 A1 | | 5/2013 | Sukhanov et al. | |
| 2015/0089366 A1 | * | 3/2015 | Beckett | G06F 3/0484 715/716 |

OTHER PUBLICATIONS

Hummersgaard, Rasmus et al., "Mid-Air Gesture-Based Interface: Developing, Modeling and Use", HCI Master Thesis, Jun. 6, 2012, 52 pages.
Vbandi, "Kinect Interactions with WPF—Part I: Getting Started", Dotneteers.net, http://dotneteers.net/blogs/vbandi/archive/2013/03/25/kinect-interactions-with-wpf-part-i-getting-started.aspx, Published Mar. 25, 2013, Accessed Apr. 7, 2014, 19 pages.

* cited by examiner

*Primary Examiner* — Claudia Dragoescu
(74) *Attorney, Agent, or Firm* — Dan Choi; Judy Yee; Micky Minhas

(57) ABSTRACT

Embodiments are disclosed that relate to providing feedback for a level of completion of a user gesture via a cursor displayed on a user interface. One disclosed embodiment provides a method comprising displaying a cursor having a visual property and moving a screen-space position of the cursor responsive to the user gesture. The method further comprises changing the visual property of the cursor in proportion to a level of completion of the user gesture. In this way, the level of completion of the user gesture may be presented to the user in a location to which the attention of the user is directed during performance of the gesture.

20 Claims, 7 Drawing Sheets

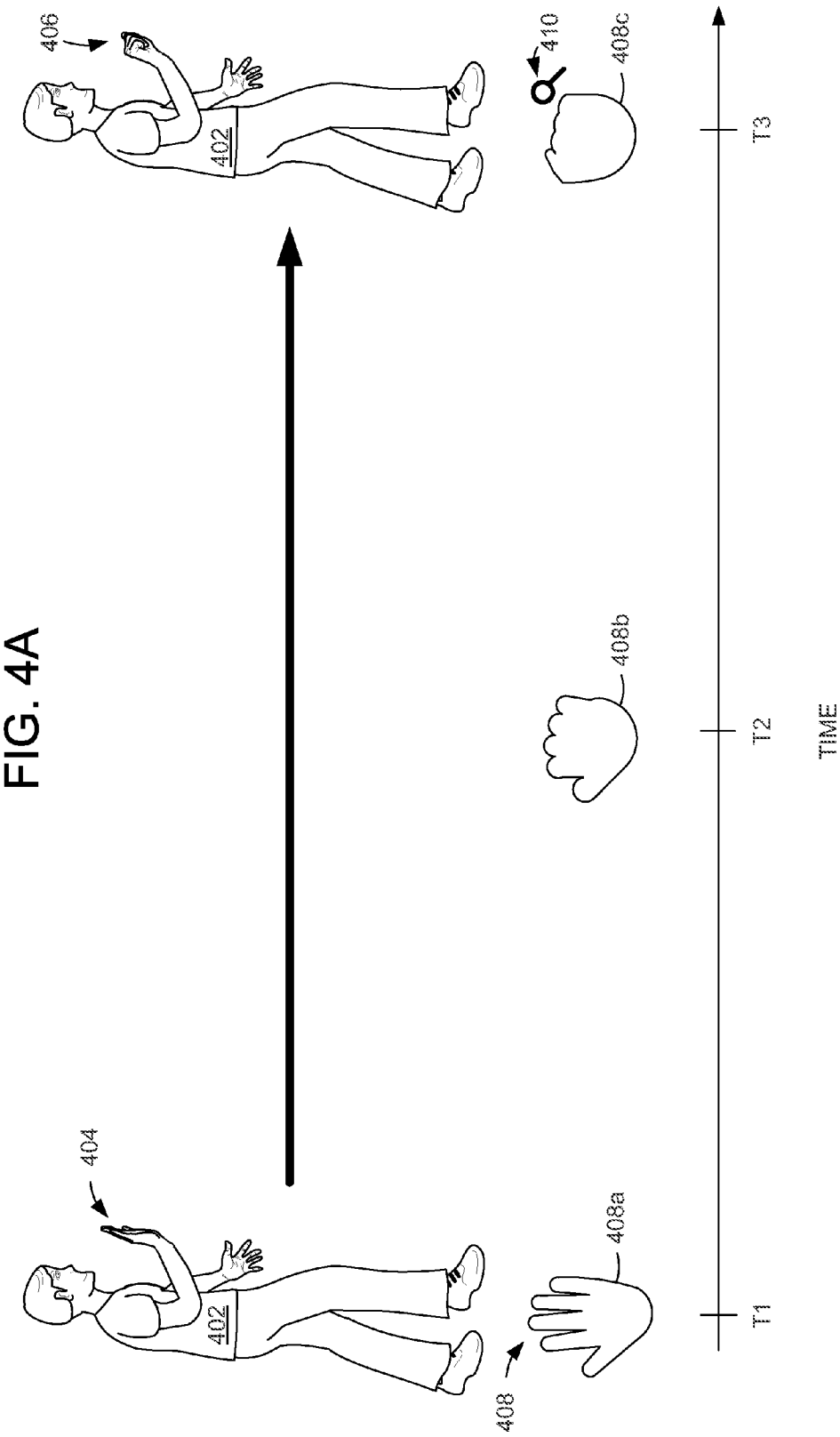

VISUAL FEEDBACK FOR LEVEL OF
GESTURE COMPLETION

BACKGROUND

In many computing systems, cursor-based experiences are presented as a user interacts with a mouse or other input device to translate two-dimensional movement in the physical world into two-dimensional movement on a display screen. A user may also provide input corresponding to a physical button or key press, which provides haptic feedback to the user upon successful completion of the button or key press. As interactive environments expand beyond traditional, desktop computing systems, user interaction with the computing system may incorporate three-dimensional movements of a hand or other object for controlling an aspect of a user interface. The movements of the hand or other object may be performed in order to produce a gesture that is associated with a function and recognizable by the computing system.

SUMMARY

Embodiments are disclosed that relate to providing feedback for a level of completion of a user gesture via a cursor displayed on a user interface. For example, one disclosed embodiment provides a method comprising displaying a cursor having a visual property and moving a screen-space position of the cursor responsive to the user gesture. The method further comprises changing the visual property of the cursor in proportion to a level of completion of the user gesture.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 4A and 4B shows examples of visual feedback provided via a cursor as a gripping gesture is performed by a user in accordance with an embodiment of the present disclosure.

DETAILED DESCRIPTION

Embodiments are disclosed that relate to providing visual feedback via a cursor regarding a level of completion of a user gesture. In this way, the level of completion of the user gesture may be presented to the user in a location to which the attention of the user is directed during performance of the gesture.

Figure 1:
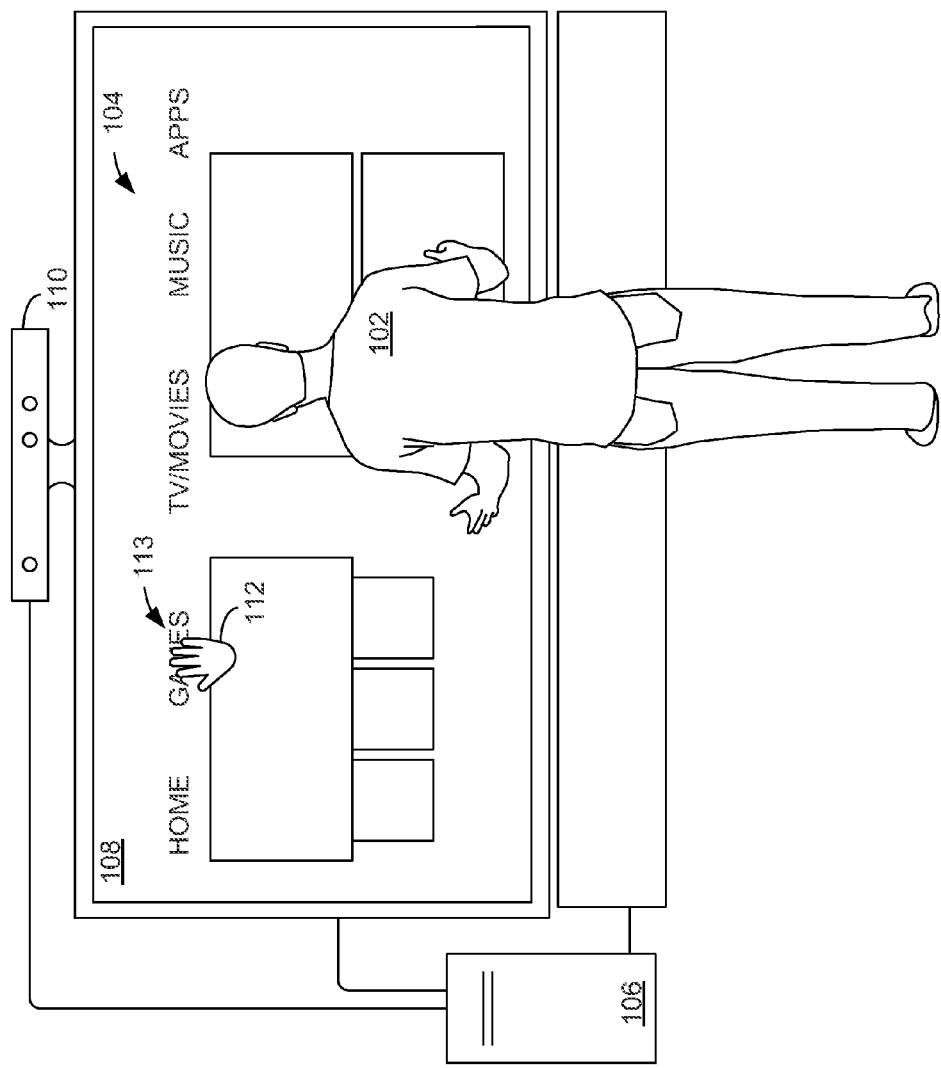
FIG. 1 shows an example interactive environment in accordance with an embodiment of the present disclosure.

FIG. 1 shows an example interactive environment in which a user 102 may provide gesture input to control a user interface 104 provided (e.g., generated) by a computing device 106 and displayed on a display device 108. For example, the computing device may include and/or be communicatively connected to an imaging device 110, such as one or more visible light cameras, depth cameras, and/or any other suitable imaging device(s). The imaging device 10 may capture images of the user 102 over time to determine user input provided via a hand of the user 102 or other object controlled by the user 102.

The user interface 104 may include a cursor 112 configured to indicate a position of a user-controllable element within the user interface. Although illustrated as a hand-shaped cursor, it is to be understood that the cursor 112 may have any suitable appearance, such as an arrow, a circle, etc. Similar to the way in which mouse movements may be mapped to cursor movements in a desktop computing environment, the cursor 112 may move responsive to movements of a hand of the user 102 and/or any other appendage(s) or object(s) moved by the user 102. The cursor 112 may provide an indication of a location of the user interface that may be controlled by user input provided via a gesture or other input mechanism. For example, while the cursor is "hovering over" or otherwise located on or near a portion of a displayed user interface that may be manipulated by a user, user input may be provided to control that portion of the user interface. In the example illustrated in FIG. 1, the cursor 112 is positioned as an overlay over a textual element 113 that may correspond to a menu item. Performing a gesture or otherwise providing user input corresponding to a selection function may thus result in a selection of the menu item presented as the textual element 113. Similarly, performing a gesture or otherwise providing user input corresponding to a zoom function may result in zooming at least the portion of the user interface located near the cursor 112.

While the user 102 is performing a gesture, the computing device 106 may determine the gesture that is being performed based on a gesture that most closely matches the path of travel of a hand of the user or other appendage and/or object being moved by the user. Mapping such movement may include tracking a physical interaction zone that moves with the user in order to ensure that the movement of the hand or other object is interpreted relative to the user, rather than the environment of the user. In this way, the user may move within the environment without affecting the interpretation of the gesture. For example, if a gesture includes moving a hand of the user away from the user (e.g., away from a body of the user), which may correspond to movement of the hand toward a camera of the computing device, the physical interaction zone may enable the user to move toward or away from the camera without affecting the interpretation of the gesture. In other words, if the user moves toward the camera while maintaining a constant separation between the hand and the body of the user, such movement may not be interpreted as contributing to the completion of the gesture. Similarly, if the user rotates relative to the camera, such rotation may have no impact on the interpretation of the gesture. Accordingly, a gesture performed while the user rotates and/or moves relative to the camera may be interpreted identically to the same gesture being performed as the user remains stationary (e.g., does not move or rotate) relative to the camera.

In order to interpret gestures using a physical interaction zone as described above, the position of the centroid of the right hand (or the hand that is providing input) may be tracked via a gesture-recognition engine of the computing device 106 in any suitable coordinate system—e.g., relative to a coordinate system fixed to the user's torso. This approach offers an advantage in that the mapping can be made independent of the user's orientation relative to imaging device 110 or display 108. Thus, the gesture-recognition engine may be configured to map coordinates of the user's right hand in an interaction zone (e.g., having a first coordinate system of r, α, β) to two-dimensional coordinates in the plane of the display (e.g., having a second coordinate system of X, Y). In one embodiment, the mapping may involve projection of the hand coordinates in the frame of reference of the interaction zone, onto a vertical plane parallel to the user's shoulder-to-shoulder axis. The projection is then scaled appropriately to arrive at the display coordinates (X, Y). In other embodiments, the projection may take into account the natural curvature of the user's hand trajectory as the hand is swept horizontally or vertically in front of the user's body. In other words, the projection may be onto a curved surface rather than a plane, and then flattened to arrive at the display coordinates.

Gestures performed by the user 102 may involve moving a hand or other object along a particular path, as described above. In attempting to complete the gesture, inaccuracies may arise, as the user may not be aware of how much further along the path the hand or object must be moved before the gesture is completed. Similarly, the user may not be aware of circumstances in which the hand or object has deviated from a path associated with a gesture, such that the user is no longer performing the gesture. Accordingly, visual feedback may be provided via the cursor 112 in order to assist the user in completing the gesture.

Figure 2:
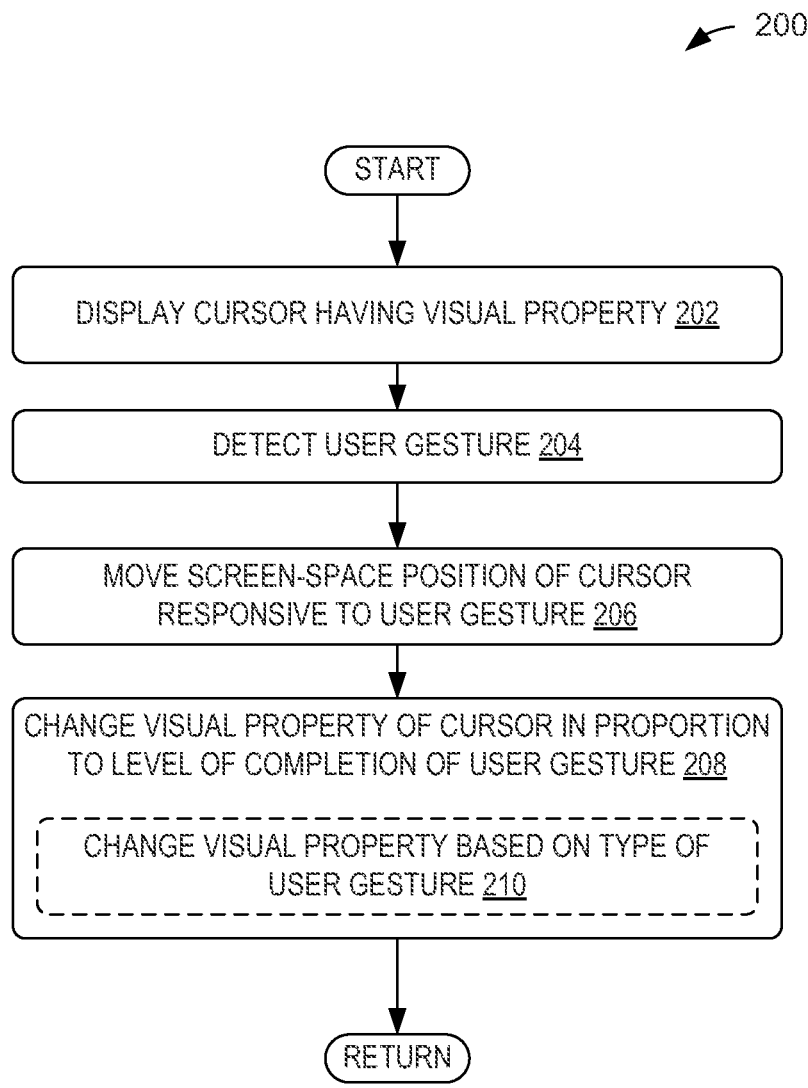
FIG. 2 is a flow chart of a method of providing visual feedback of a level of completion of a user gesture via a cursor in accordance with an embodiment of the present disclosure.

FIG. 2 is a flow chart of a method 200 of providing visual feedback of a level of completion of a user gesture via a cursor (e.g., the cursor 112 of FIG. 1). The method 200 may be performed by any suitable computing device, such as computing device 106 of FIG. 1. Method 200 includes displaying a cursor having a visual property, as indicated at 202. The visual property may include a feature of the cursor that is visible to the user and may be modified to indicate a feature related to the cursor and/or user-input associated with the cursor. At 204, the method 200 includes detecting a user gesture. The user gesture may be detected when a path of a hand of a user or other element controlled by the user corresponds to at least a portion of a path of a defined user gesture recognized by the computing device in some embodiments. In additional or alternative embodiments, image data including images of a user may be sent to a server that is external to the computing device for determining and interpreting user gestures. It is to be understood that a user gesture may be detected in any suitable manner.

As indicated at 206, the method 200 includes moving a screen-space position of the cursor responsive to the user gesture. For example, the cursor may be moved in proportion to an amount of movement of the hand of the user (or other object controlled by the user) in the physical space of the user in order to map the movement of the hand to the cursor. The physical space may correspond to the physical interaction zone described above, such that movements of the user are interpreted relative to the physical interaction zone. At 208, the method 200 includes changing the visual property of the cursor in proportion to a level of completion of the user gesture. For example, the user gesture may be predefined or otherwise known to the computing device. Different stages of the gesture may be defined such that each stage corresponds to a level of completion of the gesture (e.g., a percentage of the gesture that has been performed). As an illustrative example, a user gesture may comprise a selection gesture in which a user moves a hand from a first location closer to the user (e.g., closer to a body of the user) to a second location farther from the user (e.g., farther from the body of the user). The different levels of completion of such a gesture may correspond to different distances between the hand and the user.

In some embodiments, the visual property may be changed based on the type of user gesture detected by the computing device, as indicated at 210. More details relating to changing a visual property based on a type of user gesture is described with reference to FIG. 3.

Figure 3:
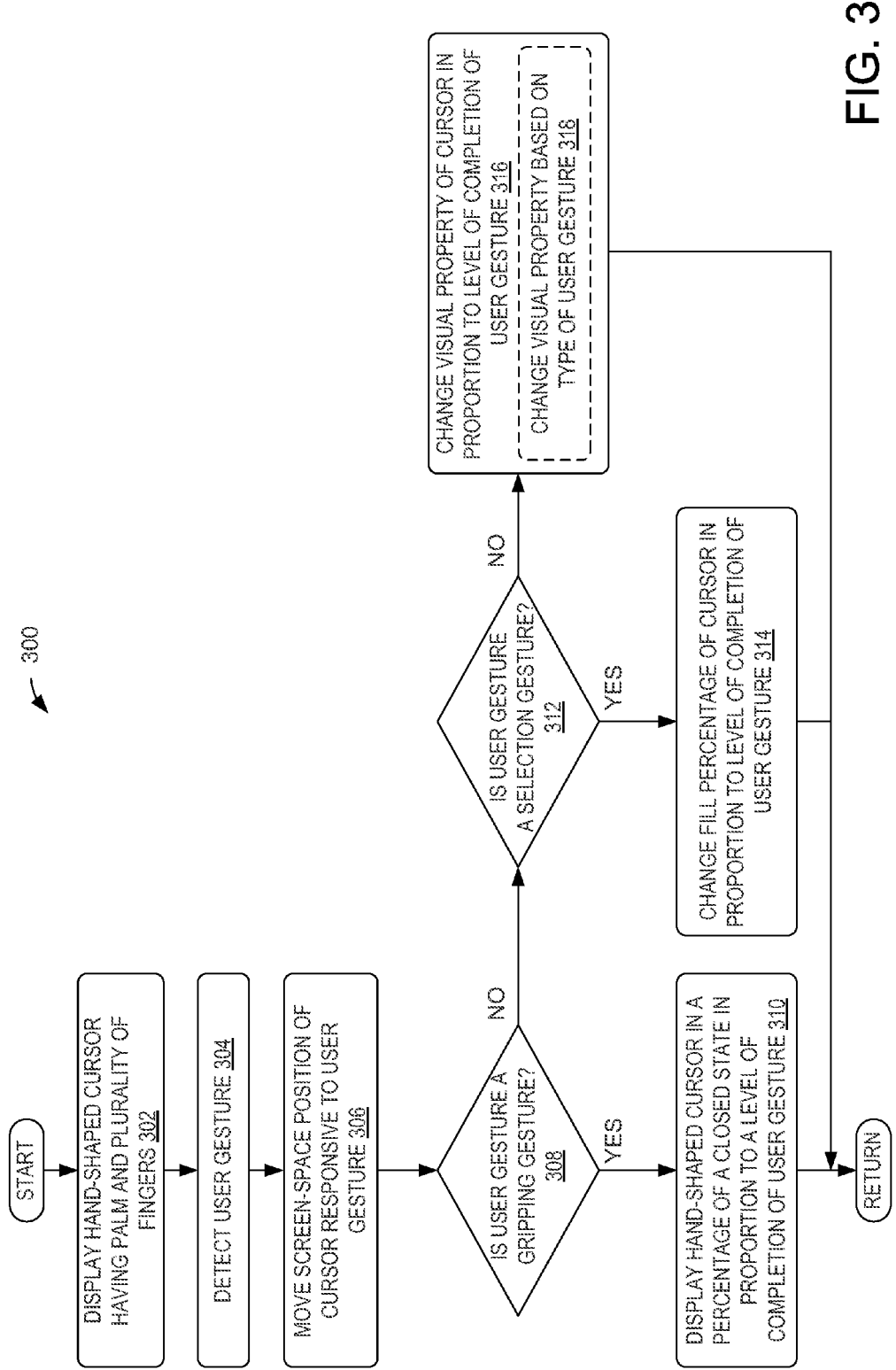
FIG. 3 is a flow chart of a method of providing visual feedback of a level of completion of a user gesture based on the type of gesture performed in accordance with an embodiment of the present disclosure.

FIG. 3 is a flow chart of a method 300 of providing visual feedback of a level of completion of a user gesture based on the type of gesture performed. At 302, the method 300 includes displaying a hand-shaped cursor having a palm and a plurality of fingers. For example, the hand-shaped cursor may have an appearance similar to cursor 112 of FIG. 1. In some embodiments, the cursor may have an appearance that matches the hand of the user providing input, such that a cursor representing a right hand is displayed when the user provides input via a right hand, and a cursor representing a left hand is displayed when the user provides input via a left hand. In additional or alternative embodiments, multiple cursors may be displayed, each cursor representing a different hand of the user and/or different users providing input. Each cursor may have an appearance and/or change an appearance based on the user performing the gesture. For example, each user may select a color, shape, or other visual feature associated with a cursor assigned to that user. In this way, the color of the cursor may identify the user determined to be in control of the cursor (e.g., the user providing gesture input). The cursor optionally may be rotatable in three dimensions to match an orientation of the hand of the user in real-time.

For example, in response to simultaneous user input from two hands of a user (e.g., while rotating a large, three-dimensional object), two cursors may be displayed, having a similar appearance (e.g., having a color based on the user providing the input). As the user provides input via the two hands, feedback effects, such as fill amount, fill color, point of contact animation, and/or other displayable features of the cursors may be assigned independently based on the position of the corresponding hand and/or the percentage of completion of a gesture being performed by that hand.

The method 300 includes detecting a user gesture at 304 and moving a screen-space position of the cursor responsive to the user gesture at 306. For example, the detecting and moving may be performed in a similar manner to that described above with respect to FIG. 2. At 308, the method includes determining if the user gesture is a gripping gesture. For example, a state of the hand may be determined, the state corresponding to whether the hand is opened or closed and/or is being altered from an open to a closed state. If the user gesture is a gripping gesture (e.g., "YES" at 308), the method 300 proceeds to 310 to display a hand-shaped cursor as a percentage of a closed state in proportion to a level of completion of a user gesture.

Turning briefly to FIG. 4A, an example performance of a gripping gesture and associated cursor change is illustrated. As a user 402 progresses from presenting an open hand 404 for imaging by an imaging device at time T1 to presenting a closed hand 406 (e.g., a first) for imaging by the imaging device at time T11, a hand-shaped cursor 408 may change from an open hand 408*a* to a partially closed hand 408*b*, and finally to a closed hand 408*c* (e.g., a fist). In this way, the hand-shaped cursor 408 may be displayed as a percentage of a closed state, such that at time T1, the cursor is zero percent closed, and at time T3, the cursor is one hundred percent closed. The different appearances of the cursor may represent different stages of completion of the gesture, such as an indication that a gesture has been initiated, an indication that the gesture is in the process of being performed, and a confirmation that the gesture has been completed. In some embodiments, the change in the cursor 408 may directly mimic the hand of the user 402, such that the amount of closure of the hand-shaped cursor 408 is substantially identical to the amount of closure of the hand of the user 402 at any given time during the performance of the gesture. In other embodiments, the hand-shaped cursor 408 may have a predefined number of appearances, such that the cursor changes to a next appearance upon the user 402 reaching a certain stage in performing the gesture (e.g., the user closing a hand a particular amount). For example, the cursor 408 may be displayed as an open hand 408a until a threshold number of fingers of the hand of the user 402 have moved a threshold distance toward a palm of the user 402, at which point the partially closed hand 408b is displayed. Subsequently, the partially closed hand 408b may be displayed until the user 402 completes the gesture (e.g., closes a hand), at which time the closed hand 408c is displayed as confirmation of completion of the gesture.

As illustrated, upon completion of the gesture, an icon 410 may be displayed in a location that is spaced from the cursor to indicate the function associated with the gesture. In the illustrated example, the icon 410 is a magnifying glass, indicating that a zoom gesture has been initiated and that further movements by the user 402 may result in zoom functions being performed. It is to be understood that the function associated with a gripping gesture may be any suitable function, and the icon may be different for each function. The function associated with the gripping gesture may also change based on a context of the identity or state of the user, the computing device, the environment of the user (e.g., time of day, location, nearby objects, etc.), and/or any other suitable context. For example, the gripping gesture may have a first function when a first application executed by a computing device has active focus and a second, different function when a second application executed by the computing device has active focus. The gesture-to-function mapping may be selected by a user, an application, a computing device, and/or defined by any other suitable mechanism.

Figure 4B:
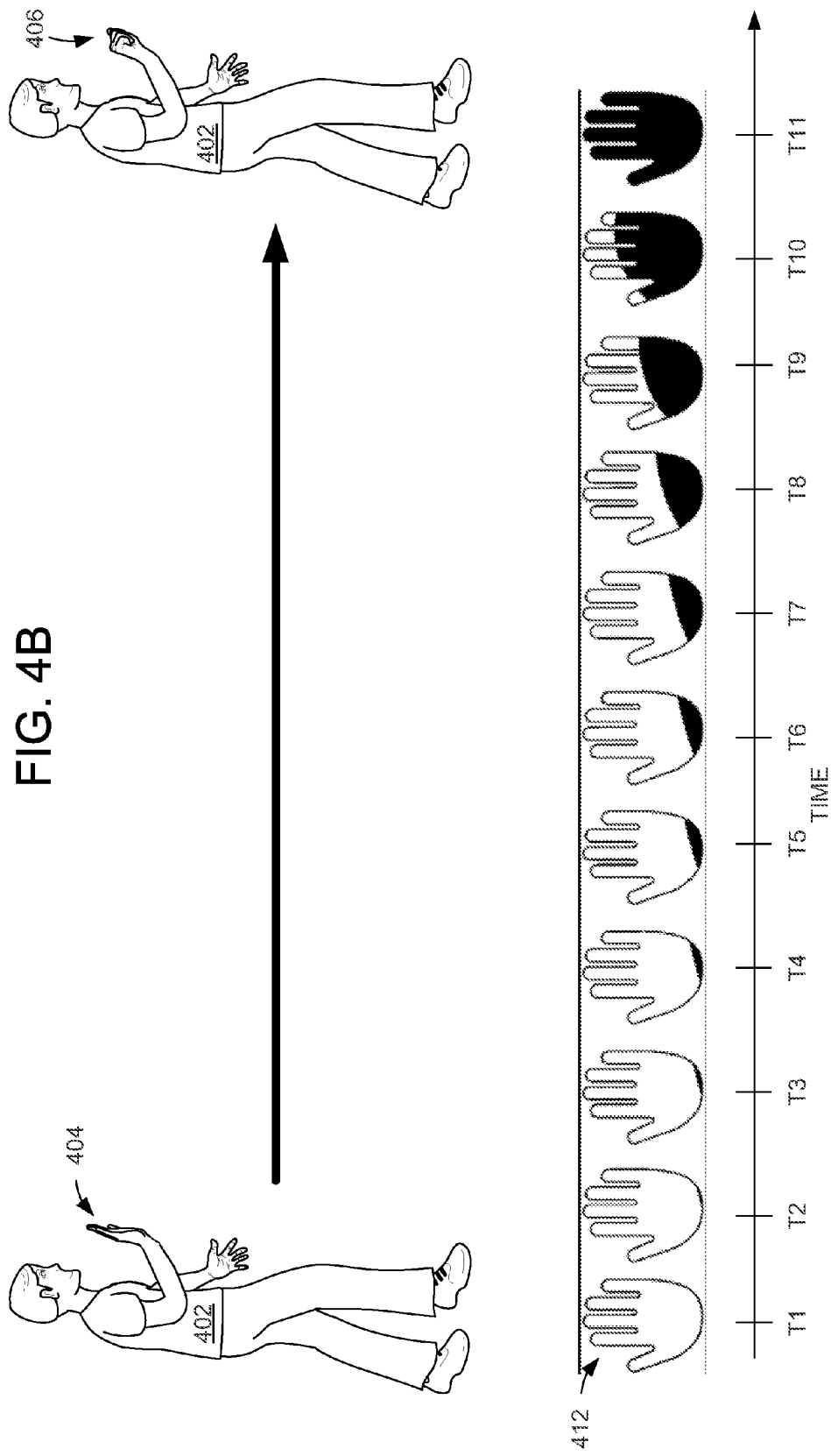

It is to be understood that the appearance of the cursor 408 may take any suitable form and be changed in any suitable manner for a given gesture. For example, as an alternative to displaying a hand-shaped cursor that progressively closes as a user performs a gripping gesture, an alternative appearance of a hand-shaped cursor 412 over time is illustrated in FIG. 4B. In the alternative appearance, the hand-shaped cursor 412 is progressively filled with a fill color as the user 402 progresses from presenting an open hand to presenting a closed hand. Accordingly, at time T1, in which the user 402 presents an open hand, the cursor 412 is completely unfilled, whereas at time T11, in which the user 402 presents a closed hand to complete the gripping gesture, the cursor 412 is completely filled. Between times T1 and T11, a fill color radiates from a bottom right corner of the cursor to a top left corner of the cursor such that a percentage of the cursor 412 that is filled with the fill color increases as the hand of the user becomes more closed (e.g., as the level of completion of the gesture increases).

Returning to FIG. 3, if the user gesture is not determined to be a gripping gesture (e.g., "NO" at 308), the method proceeds to 312 to determine whether the user gesture is a selection gesture. For example, the state of a hand of a user and/or a path of travel of a hand of a user may be evaluated by the computing device and/or a server to determine if the state of the hand and/or path of travel matches a portion of a selection gesture. If the user gesture is determined to be a selection gesture (e.g., "YES" at 312), the method 300 proceeds to 314 to change a fill percentage of a cursor in proportion to a level of completion of a user gesture. One example of changing a fill percentage of a cursor is described above with respect to FIG. 4B. Another example of a changing a fill percentage of a cursor is illustrated in FIG. 5.

Figure 5:
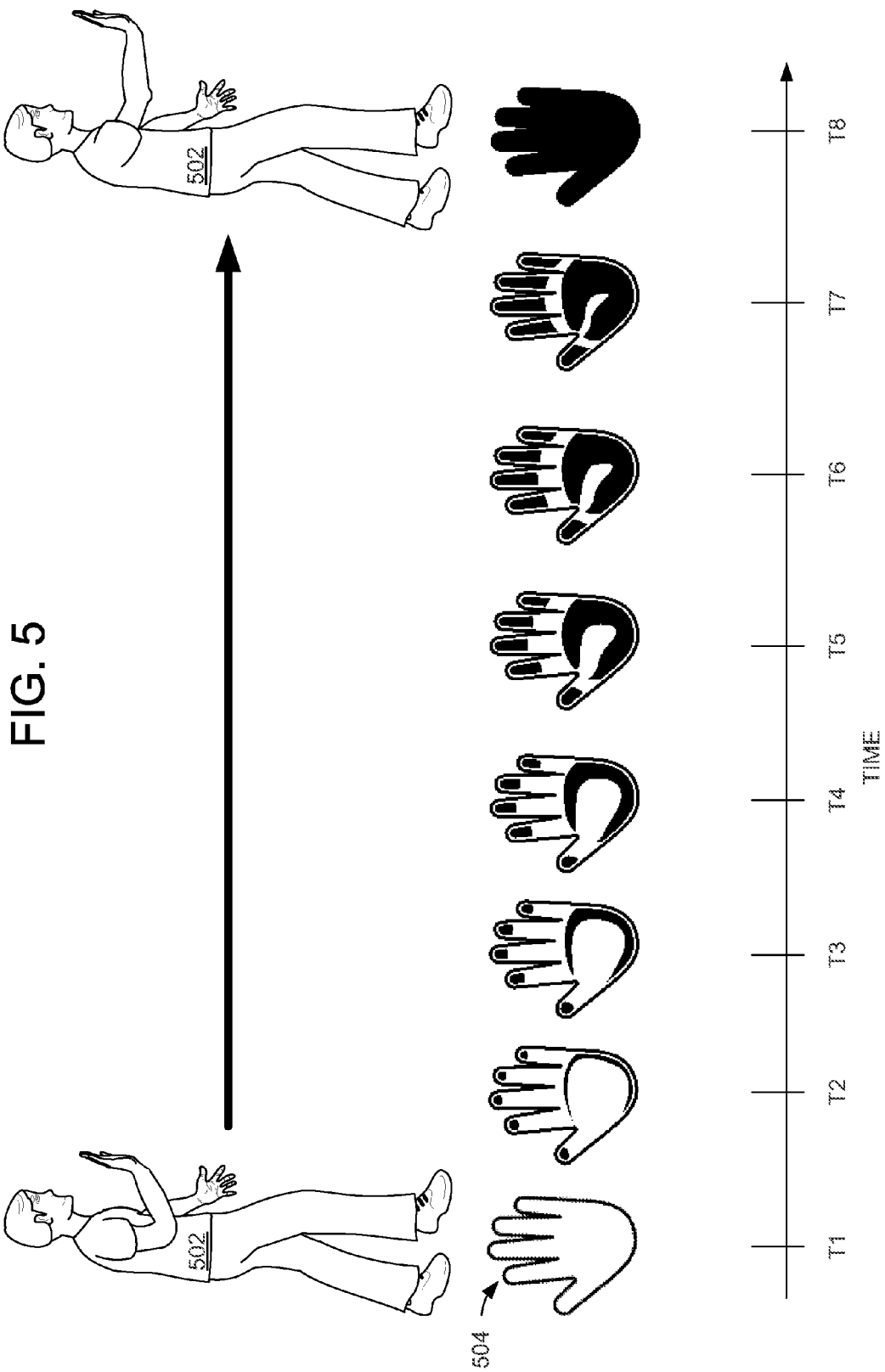
FIG. 5 shows an example of visual feedback provided via a cursor as a selection gesture is performed by a user in accordance with an embodiment of the present disclosure.

Turning briefly to FIG. 5, an example of visual feedback provided via a cursor as a selection gesture is performed by a user is illustrated. The selection gesture may include a simulation of pressing a button, such that the gesture begins with a user 502 presenting an open hand for imaging by an imaging device. The selection gesture may be completed when the user 502 moves the open hand from a first distance from the user to a second distance from the user. For example, upon moving the hand a threshold distance away from the user, the selection gesture may be completed. The threshold distance may be determined based on an initial position of the hand relative to the body of the user. In additional or alternative embodiments, the threshold distance may be absolute, such that the gesture is completed upon the hand of the user coming within a threshold distance of the imaging device, regardless of a starting point of the hand. In the illustrated embodiment, the selection gesture is completed at time T8, when the hand of the user is moved a threshold distance away from the initial position of the hand.

A hand-shaped cursor 504 has a first appearance at time T1, when the user 502 is at a starting point of the gesture (e.g., the hand of the user is in an initial position). At time T1, the cursor 504 is completely unfilled with a fill color (e.g., zero percent of the cursor is filled). In such an unfilled state, the interior of the cursor (e.g., within the outline defining the fingers and palm of the hand) may be fully or partially transparent, such that portions of a user interface displayed in the location of the cursor are visible through the interior of the cursor. In other embodiments, the interior of the cursor may be filled with a first color, such as white, in an unfilled state, such that filling the cursor with the fill color includes changing portions of the interior of the cursor from the first color to the fill color. The first color may be different from the fill color and/or a lighter or darker shade of the fill color. The first color, fill color, and/or transparency level described above may be predefined, selected by a user, defined by an application (e.g., an application having active focus on a computing device at the time that the gesture is being performed), and/or selected in any other suitable manner.

In contrast to the example described in FIG. 4, in which a cursor 412 is filled from a bottom right corner to a top left corner, the example progression of the hand-shaped cursor 504 of FIG. 5 may proceed in a manner that simulates a hand being pressed against a surface, such as a glass surface. Accordingly, a fill percentage of the palm of the hand-shaped cursor may increase from a perimeter of the palm inward and the fill percentage of the plurality of fingers of the hand-shaped cursor may increase from tips of the fingers towards the palm. For example, as shown at time T2, which may correspond to a stage of the selection gesture in which the hand of the user 502 has moved a first, short distance from the user, only the very tips of the fingers of the cursor and the very edge of the palm directly under the fingers and along an outer periphery of the bottom and bottom-right portions of the hand-shaped cursor are filled with a fill color. As the user progresses through the selection gesture (e.g., moves a hand further away from the body of the user/closer to the imaging device), a greater percentage of the fingers and palm of the hand-shaped cursor are filled with the fill color (e.g., a greater amount of the first color is replaced with the fill color).

At time T7, which may correspond to a stage of the selection gesture in which the hand of the user 502 has moved a second, great distance from the user, the hand-shaped cursor 504 is almost completely filled with the fill color, such that only the very bottom-most portions of the fingers and the inner-most portions of the palm are unfilled. At time T8, the hand-shaped cursor 504 is completely filled with the fill color (e.g., one hundred percent of the hand-shaped cursor is filled, and/or all of the first color is replaced with the fill color), indicating that the gesture has been successfully completed. Accordingly, in the example illustrated in FIG. 5, the fingers of the hand-shaped cursor 504 and the palm of the hand-shaped cursor 504 may be considered as being different regions that have individual associated fill percentages. In additional or alternative embodiments, point of contact animations and/or other feedback may be presented as confirmation of completion of the gesture. For example, an image comprising an outline of the cursor displayed around a periphery of the cursor may progressively constrict toward the cursor and/or expand away from the cursor. The animation may include any suitable visual effect, including but not limited to a change in opacity, size, shape, color, etc. of the cursor and/or a visual effect displayed around a periphery of the cursor.

Upon completion of the selection gesture at time T11, a function associated with the selection gesture may be performed. For example, a selectable user interface element over which the cursor 504 is displayed in a user interface may be selected. It is to be understood that the cursor providing visual feedback (e.g., the example cursor changes described above with respect to FIGS. 4A, 4B, and 5) may continue to mimic movements of the hand of the user, even while a visual property of the cursor is being changed. For example, the screen-space position of the cursor may be continually mapped to a position of the hand of the user relative to the user (e.g., the body of the user) in physical space throughout performance of the gesture and while the visual property of the cursor is being changed responsive to the level of completion of the gesture.

Returning to FIG. 3, if the user gesture is not determined to be a selection gesture (e.g., "NO" at 312), the method 300 may proceed to 316 to change a visual property of a cursor in proportion to a level of completion of the user gesture. The visual property may be any suitable visual feature of the cursor, such as the fill percentage described above with respect to FIGS. 4A, 4B, and 5, a shape of the cursor, a size of the cursor, a color of the cursor, etc. As indicated at 318, the visual property that is changed and the way in which the visual property is changed may be based upon a type of user gesture, such that different gestures result in different types of cursor feedback.

By providing visual feedback of a level of completion of a user gesture in the form of changing a visual property of a cursor on a user interface, a user may be able to intuitively determine how close the gesture is to being completed and confirm when a gesture has been successfully completed. In this way, the user may be informed of different stages of the gesture such that future performances of the gesture may be completed more smoothly and confidently. As gestures often control elements of a user interface in a region of a cursor, providing such visual feedback via the cursor enables the user to determine the level of completion of the gesture without having to focus on a different area of the user interface that may be spaced from the user interface element being controlled. By changing a visual property of the cursor differently for different gestures, the change in the visual property may be selected to correspond to a feature of the movement of the user to perform the gesture. For example, progressively closing a hand-shaped cursor responsive to performing a gripping gesture mimics the actions performed by the user to complete the gesture. In this way, the user may intuitively interpret the feedback by tying the feedback to the motions associated with performing the gesture.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
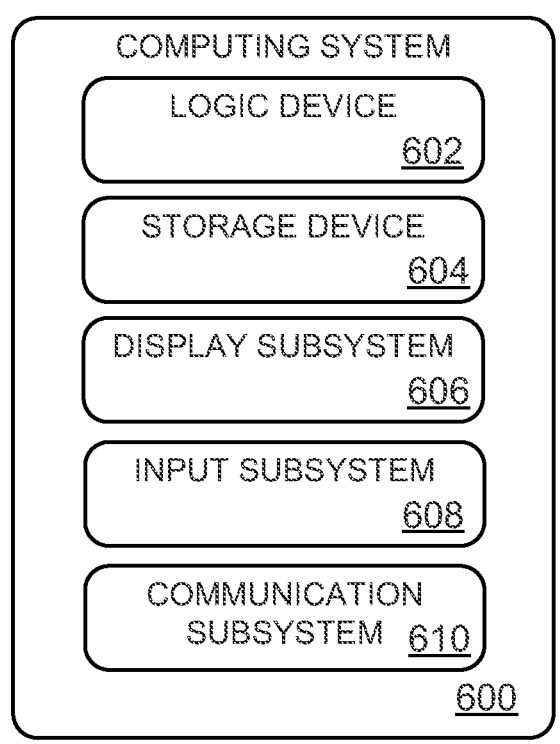
FIG. 6 shows an example of a computing device in accordance with an embodiment of the present disclosure.

FIG. 6 schematically shows a non-limiting embodiment of a computing system 600 that can enact one or more of the methods and processes described above. Computing system 600 is shown in simplified form. Computing system 600 may take the form of one or more gaming devices, personal computers, server computers, tablet computers, home-entertainment computers, network computing devices, mobile computing devices, mobile communication devices (e.g., smart phone), and/or other computing devices. For example, computing system 600 may correspond to computing device 106 of FIG. 1.

Computing system 600 includes a logic machine 602 and a storage machine 604. Computing system 600 may optionally include a display subsystem 606, input subsystem 608, communication subsystem 610, and/or other components not shown in FIG. 6.

Logic machine 602 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 604 includes one or more physical devices configured to hold instructions executable by the logic machine to implement the methods and processes described herein. When such methods and processes are implemented, the state of storage machine 604 may be transformed—e.g., to hold different data.

Storage machine 604 may include removable and/or built-in devices. Storage machine 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 604 may include volatile, nonvolatile, dynamic, static, read/write, read-only, random-access, sequential-access, location-addressable, file-addressable, and/or content-addressable devices.

It will be appreciated that storage machine 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 602 and storage machine 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 606 may be used to present a visual representation of data held by storage machine 604. This visual representation may take the form of a graphical user interface (GUI), such as user interface 104 of FIG. 1. As the herein described methods and processes change the data held by the storage machine, and thus transform the state of the storage machine, the state of display subsystem 606 may likewise be transformed to visually represent changes in the underlying data. Display subsystem 606 may include one or more display devices utilizing virtually any type of technology. Such display devices may be combined with logic machine 602 and/or storage machine 604 in a shared enclosure, or such display devices may be peripheral display devices, such as display 108 of FIG. 1.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity. For example, imaging device 110 of FIG. 1 may image an environment to accept input in the form of gestures performed by a user.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of providing visual feedback for a user gesture, the method comprising:
   displaying a cursor having one or more visual properties;
   moving a screen-space position of the cursor responsive to movement of a hand of a user in three-dimensional space, relative to a body of the user;
   selecting a visual property of the one or more visual properties based at least on a determined type of a user gesture performed with the hand, wherein the user gesture is at least one of a selection gesture for selecting an item in a user interface or a gripping gesture for performing a function in the user interface, the selection gesture including movement of the hand of the user away from the body of the user, and the gripping gesture including closing of the hand of the user, and wherein the selected visual property comprises at least one of a closed state of a hand-shaped cursor and an amount of fill of the hand-shaped cursor; and
   changing the selected visual property of the one or more visual properties of the cursor in proportion to a level of completion of the user gesture, wherein changing the selected visual property comprises at least one of closing the hand-shaped cursor, increasing the amount of fill of the hand-shaped cursor from a perimeter inwards, and increasing the amount of fill of the hand-shaped cursor from an edge toward a different edge.

2. The method of claim 1, wherein the visual property is a percentage of the cursor that is filled with a fill color.

3. The method of claim 2, wherein the fill color is selected based at least on a type of user gesture being performed.

4. The method of claim 1, wherein the cursor is a hand-shaped cursor having a palm and a plurality of fingers.

5. The method of claim 4, wherein changing the visual property of the cursor comprises changing a fill percentage of the hand-shaped cursor in proportion to a level of completion of the user gesture, the fill percentage of the palm increasing from a perimeter of the palm inward and the fill percentage of the plurality of fingers increasing from tips of the fingers towards the palm.

6. The method of claim 4, wherein the hand-shaped cursor represents one of a right hand and a left hand selected to match the hand used to perform the user gesture.

7. The method of claim 1, wherein the visual property that is changed is user-selected.

8. The method of claim 1, wherein, for a gripping gesture, the selected visual property that is changed comprises a closed state of a hand-shaped cursor, and for a selection gesture, the selected visual property that is changed comprises an amount of fill of a hand-shaped cursor.

9. The method of claim 1, wherein the cursor is a first hand-shaped cursor, the method further comprising displaying a second hand-shaped cursor, each hand-shaped cursor mapped to a different hand of a user.

10. The method of claim 1, wherein the cursor is a first hand-shaped cursor, the method further comprising displaying a second hand-shaped cursor, each hand-shaped cursor mapped to a hand of a different user.

11. A hardware storage machine holding instructions executable by a logic machine, the instructions comprising:
   instructions to display a cursor having one or more visual properties;

instructions to move a screen-space position of the cursor responsive to movement of a hand of a user in three-dimensional space, relative to a body of the user;

instructions to detect a user gesture performed by the hand of the user, wherein the user gesture is at least one of a selection gesture for selecting an item in a user interface and a gripping gesture for performing a function in the user interface, the selection gesture including movement of the hand of the user away from the body of the user, and the gripping gesture including closing of the hand of the user;

instructions to select a visual property of the one or more visual properties based at least on a determined type of the user gesture performed with the hand, wherein the selected visual property comprises at least one of a closed state of the hand-shaped cursor and an amount of fill of the hand-shaped cursor; and instructions to change the selected visual property of the one or more visual properties of the cursor in proportion to a level of completion of the user gesture, wherein a type of change of the selected visual property is selected based at least on the determined type of the user gesture, and wherein changing the selected visual property comprises at least one of closing the hand-shaped cursor, increasing an amount of fill of the hand-shaped cursor from a perimeter inwards, and increasing an amount of fill of the hand-shaped cursor from an edge towards a different edge.

12. The hardware storage machine of claim 11, the instructions further executable to determine a state of a hand, the state indicating a level of closure of the hand.

13. The hardware storage machine of claim 12, the instructions further executable to provide feedback via the cursor indicating a gesture associated with the state of the hand.

14. The hardware storage machine of claim 13, wherein the feedback comprises an icon displayed in a location that is spaced from the cursor.

15. The hardware storage machine of claim 11, wherein the cursor is a hand-shaped cursor having a palm and a plurality of fingers, and wherein changing the fill percentage of the hand-shaped cursor in proportion to a level of completion of the user gesture comprises increasing the fill percentage of the palm from a perimeter of the palm inward and increasing the fill percentage of the plurality of fingers from tips of the fingers towards the palm.

16. A method of providing visual feedback for a user gesture, the method comprising:

displaying a hand-shaped cursor having one or more visual properties including a palm and a plurality of fingers;

moving a screen-space position of the hand-shaped cursor responsive to movement of a hand of a user in three-dimensional space, relative to a body of the user;

detecting a user gesture performed by the hand of the user, wherein the user gesture is at least one of a selection gesture for selecting an item in a user interface and a gripping gesture for performing a function in the user interface, the selection gesture including movement of the hand of the user away from the body of the user, and the gripping gesture including closing of the hand of the user;

selecting a visual property of the one or more visual properties based at least on a determined type of the user gesture performed with the hand, wherein the selected visual property comprises at least one of a closed state of the hand-shaped cursor and an amount of fill of the hand-shaped cursor; and changing the selected visual property of the one or more visual properties in proportion to a level of completion of the user gesture, wherein a type of change of the selected visual property is selected based at least on the determined type of the user gesture, and wherein changing the selected visual property comprises increasing the fill percentage of the palm from a perimeter of the palm inward and increasing the fill percentage of the plurality of fingers from tips of the fingers towards the palm.

17. The method of claim 16, wherein the hand-shaped cursor is rotatable in 3 dimensions to match an orientation of a hand of a user in real-time.

18. The method of claim 16, wherein the fill percentage comprises a percentage of the cursor that is filled with a first color, the fill percentage ranging from zero percent of the cursor being filled with the first color before the user gesture is detected to one hundred percent of the cursor being filled with the first color responsive to completion of the user gesture.

19. The method of claim 16, wherein the hand-shaped cursor is rotatable in three dimensions to match an orientation of the hand of the user in real-time.

20. The hardware storage machine of claim 11, wherein changing the selected visual property comprises changing a closing of the hand-shaped cursor responsive to the determined type of the user gesture being the gripping gesture, and wherein changing the visual property comprises changing a fill percentage of the cursor in proportion to a level of completion of the user gesture responsive to the determined type of the user gesture being the selection gesture.

* * * * *